Nov. 24, 1953

F. McDOWELL 2,660,021

BERRYPICKING MACHINE

Filed April 29, 1952

INVENTOR
Fred McDowell
BY
Kimmel & Crowell
ATTORNEYS

Nov. 24, 1953        F. McDOWELL        2,660,021

BERRYPICKING MACHINE

Filed April 29, 1952        6 Sheets-Sheet 3

INVENTOR
Fred McDowell
BY Kimmel & Crowell
ATTORNEYS

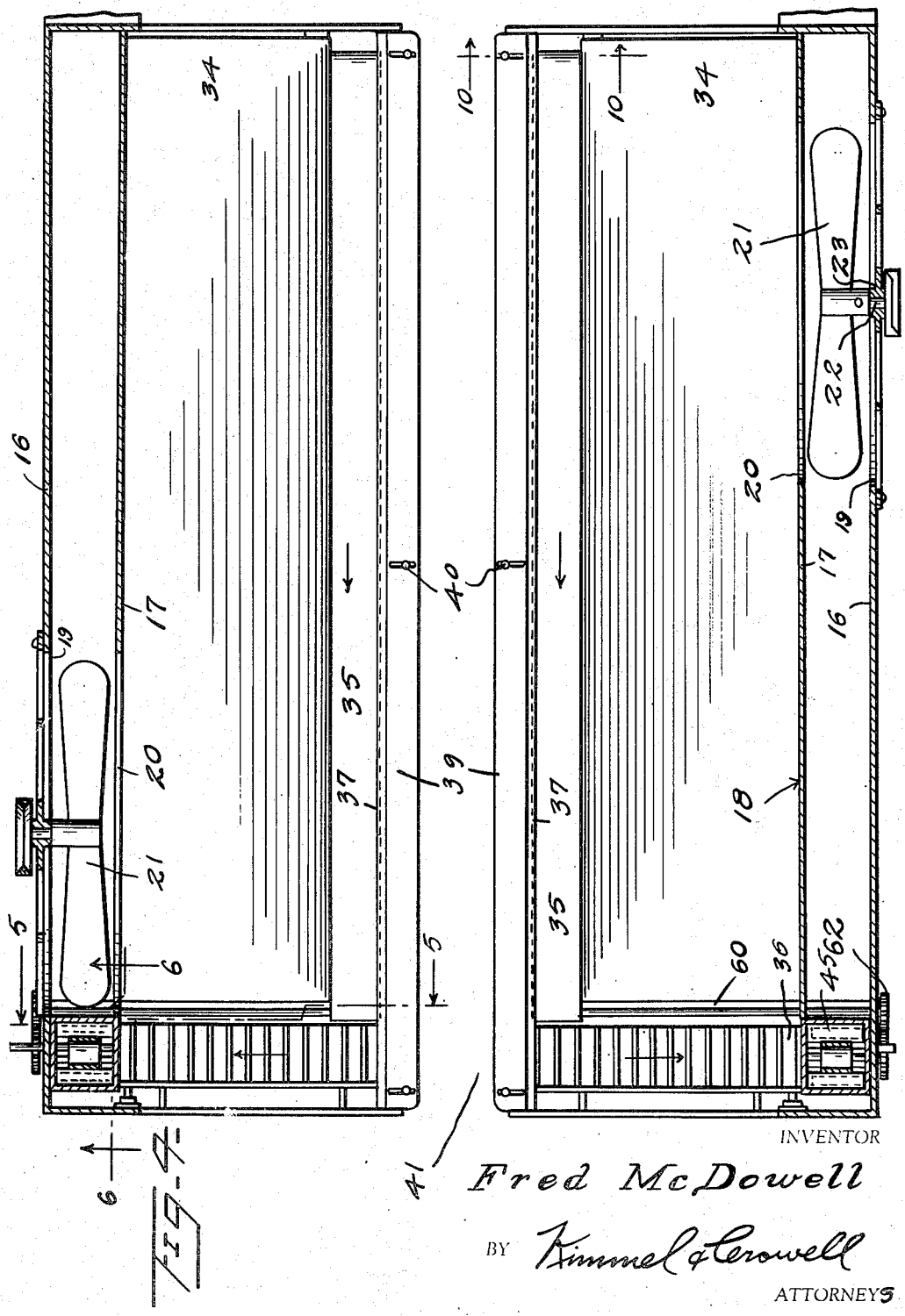

Nov. 24, 1953   F. McDOWELL   2,660,021
BERRYPICKING MACHINE
Filed April 29, 1952   6 Sheets-Sheet 5
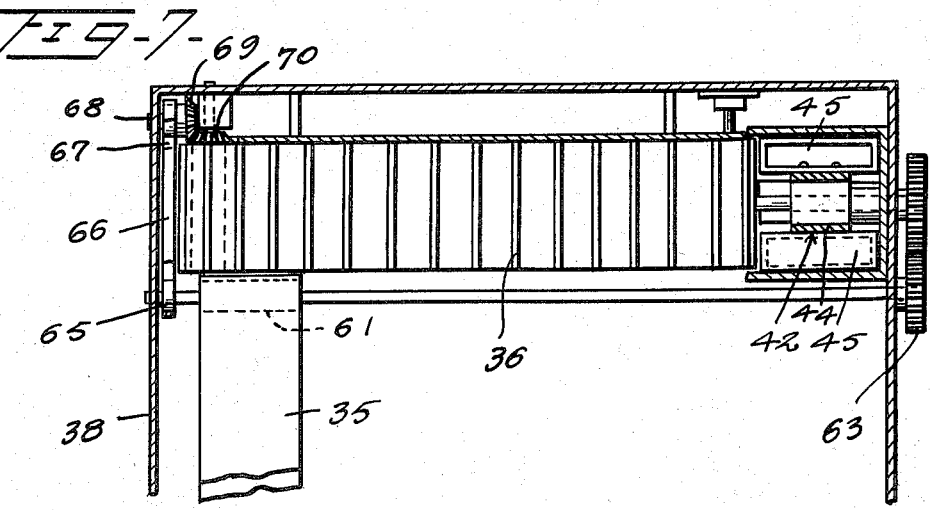
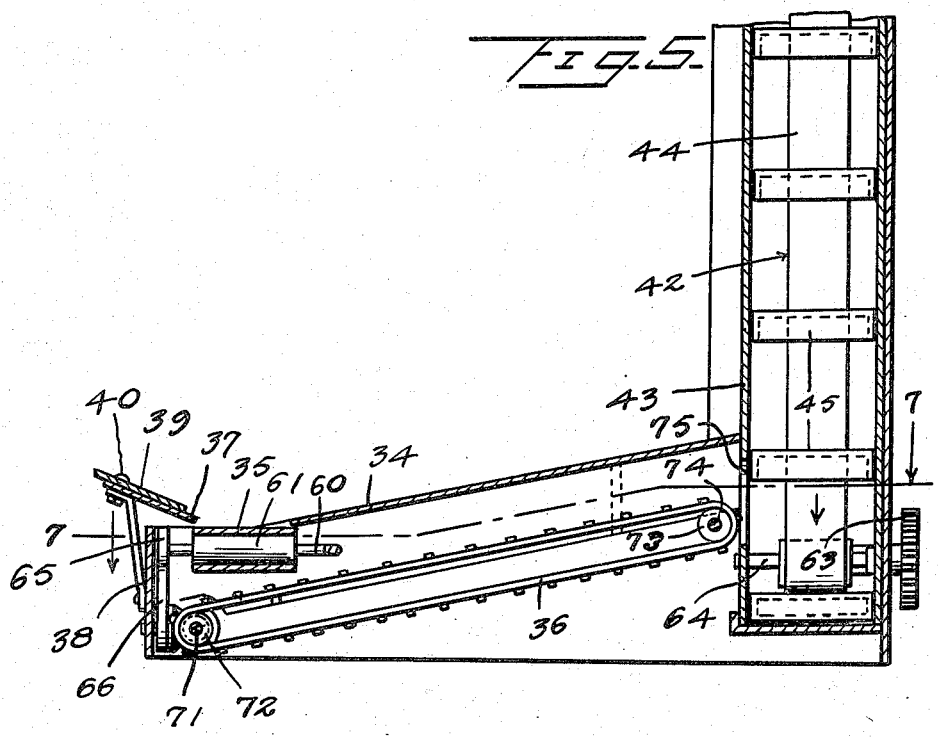
INVENTOR
Fred McDowell
BY Kimmel & Crowell
ATTORNEYS

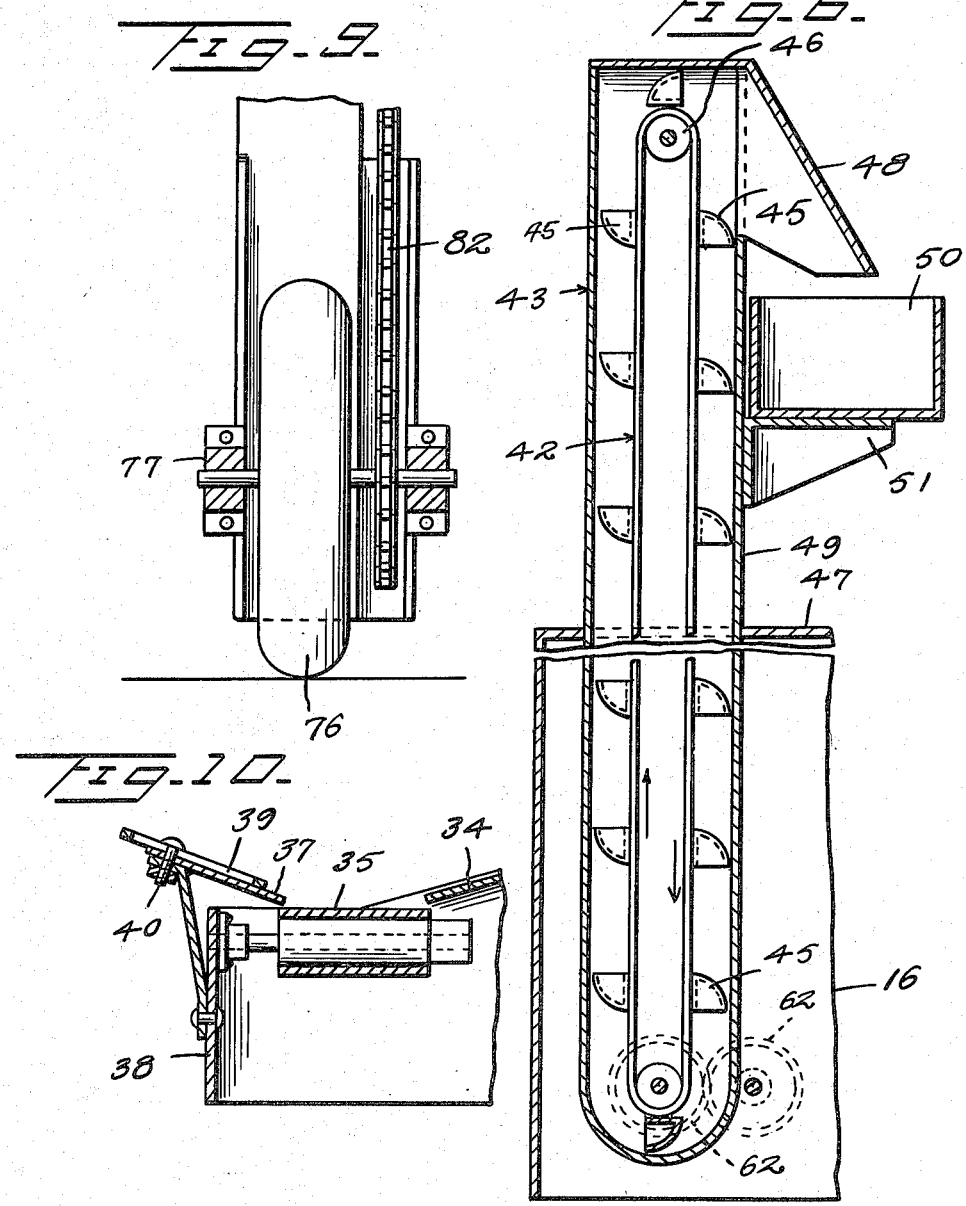

Patented Nov. 24, 1953

2,660,021

UNITED STATES PATENT OFFICE 2,660,021

BERRYPICKING MACHINE

Fred McDowell, Neptune, N. J.

Application April 29, 1952, Serial No. 284,980

4 Claims. (Cl. 56—330)

This invention relates to a berry picking machine.

An object of this invention is to provide a machine whereby berries, such as blueberries or the like may be easily and quickly removed from the plants without injury to the berries.

Another object of this invention is to provide a machine which will remove the ripe berries from the plants by means of an air pressure means with a conveying means for conveying the berries to a collector.

A further object of this invention is to provide a berry picking machine which will remove the ripe berries without injury to either the berries or the plants.

A further object of this invention is to provide a machine of this kind which can be operated with plants of varying sizes.

With the above and other objects in view, my invention consists in the arrangement, combination and details of construction disclosed in the drawings and specification, and then more particularly pointed out in the appended claims.

In the drawings:

Figure 4 is an enlarged horizontal section taken substantially on the line 4—4 of Figure 1.

Figure 5 is an enlarged sectional view taken on the line 5—5 of Figure 4.

Figure 6 is an enlarged fragmentary sectional view taken on the line 6—6 of Figure 4.

Figure 7 is a fragmentary sectional view taken on the line 7—7 of Figure 5.

Figure 8 is a fragmentary sectional view taken on the line 8—8 of Figure 1.

Figure 9 is an enlarged fragmentary rear elevation partly in section of one of the traction wheels.

Figure 10 is an enlarged fragmentary sectional view taken on the line 10—10 of Figure 4.

Figure 1:
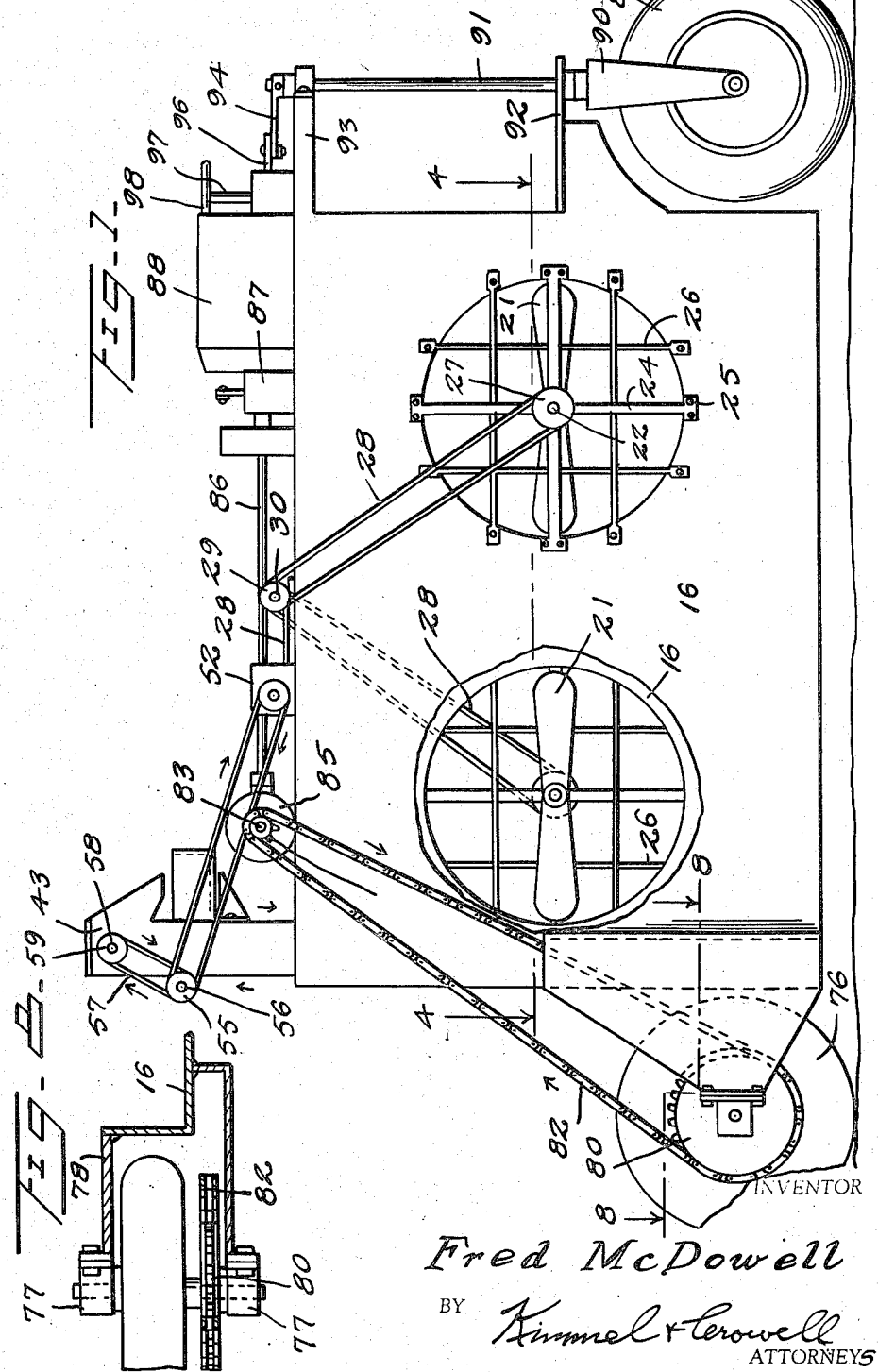
Figure 1 is a detailed side elevation partly broken away of a berry picking machine constructed according to an embodiment of this invention.

Referring to the drawings, the numeral 15 designates generally an inverted U-shaped frame structure which is formed of hollow opposite sides and top with each side having an outer side wall 16 and an inner side wall 17. The opposite side walls of the frame structure generally designated as 18 have aligned openings 19 and 20 in the walls 16 and 17 thereof, and a fan blade member 21 is rotatably disposed between the walls 16 and 17 and is coaxial with the openings 19 and 20.

The fan blades 21 are disposed in offset relation with respect to each other, with one fan blade forwardly of the fan blade in the opposite side wall so that the air blasts created by the fan blades will not be in direct opposed relation. The fan blade 21 is mounted on a shaft 22 journalled in a bearing 23 carried by the outer side wall 16, and preferably the bearing 23 is carried by a spider 24, which is fixed by fastening means 25 to the outer wall 16.

A plurality of crossed grid bars 26 are also secured across the opening 19 so as to form a guard for the fan blade 21 on the outer side of the frame structure. The shaft 22 has a pulley 27 secured thereto about which an endless belt 28 engages and the belt 28 engages about an upper pulley 29 secured to a shaft 30, which is journalled in bearings 31 disposed on the top of the frame structure 15. The shaft 30 is driven by means of a power member 32, disposed on the top of the frame 15, and an endless belt 33 forms a driving connection between the power member 32 and the shaft 30.

The frame structure 15 includes a pair of inwardly projecting and inwardly convergent bottom walls 34 which extend downwardly and terminate at a point above a longitudinal endless conveyor 35. The conveyor 35 is adapted to move rearwardly on the upper run thereof and is adapted to discharge the berries onto a rear cross elevator 36.

An upwardly and inwardly directed guide plate 37 is secured to an inner wall 38 and has the outer lengthwise edge thereof disposed slightly above the conveyor 35 so as to guide the berries downwardly onto the conveyor 35. An adjustable elongated plate 39 is mounted on the plate 37 and is adapted to be adjusted inwardly or outwardly by means of bolts 40 so that the space 41 between the inner edges of the plates 39 may be varied to accommodate plants of different sizes and so that the plates 39 will not come into direct contact at their inner upper edges with the trunks or other portions of the plants, indicated at P in Figure 2.

The two plates 34 and 37 with plate 39 form a substantially V-shaped trough which is open at the bottom, with conveyor 35 closing the opening so that the berries which are blown from the plants P and which may strike the inner wall 17 will roll downwardly over wall 34 onto conveyor 35.

A vertically disposed elevator 42 is disposed at the rear of each side wall structure 18 and the cross elevator 36 is adapted to discharge the berries into the lower portion of the elevator housing 43. The elevator 42 is formed of an endless belt 44 with cups or buckets 45 secured thereto, and the upper end of the elevator 42 engages about an upper driving drum or pulley 46. The elevator housing 43 projects above the top wall 47 of the frame 15 and a spout 48 is secured to and projects downwardly from the front wall 49 of the housing 43.

Spout 48 is adapted to direct the berries discharged from the elevator cups 45 into a receiver 50 supported on a bracket 51. The vertical elevator 42 is driven from a gear box 52 disposed on the top of the frame 15 and connected with shaft 30 by means of a flexible driving member 53. A belt 54 extends from the gear box 52 and is trained about a pulley 55 mounted on a shaft 56 which is journalled at the rear of the elevator housing 43.

A short belt 57 engages about a second pulley mounted on shaft 56 and also about a pulley 58, which is secured to the drum shaft 59 on which drum 46 is mounted. Each longitudinal conveyor 35 is operated from the rear end thereof by means of a shaft 60 journalled across the rear portion of the frame 15, and shaft 60 is secured to a rear drum or pulley 61 about which the conveyor 35 engages.

The outer end of shaft 60 has secured thereto a gear 62 which meshes with a gear 63 fixed to the lower elevator shaft 64 of the vertical elevator 42. Cross elevator 36 is operated from an extension of shaft 60, which has a pulley 65 secured thereto, and a belt 66 engages about pulley 65 and about a pulley 67 secured to a stub shaft 68 on which a beveled gear 69 is secured. A second beveled gear 70 is secured to the lower elevator shaft 71 on which a drum or wheel 72 is secured. The upper or outer end of the cross elevator 36 engages about a drum or wheel 73 secured to a shaft 74.

The upper outer end of cross elevator 36 is disposed in a position to discharge the berries through an opening 75 formed in the lower portion of housing 43. The frame structure 15 is movably supported by means of a pair of rear wheels 76 journalled in bearings 77 carried by rearwardly projecting bracket arms 78.

The axle 79 of each wheel 76 has a gear 80 secured thereto about which a chain 81 engages and chain 81 extends upwardly and forwardly and is trained about an upper sprocket 82, secured to a horizontal shaft 83. The shaft 83 is journalled in a transversely disposed housing 84 which includes a differential 85, and a drive 86 is connected at one end with the differential 85 and is connected at the other or forward end with a speed changer. The speed changer 87 is disposed at the rear of a power member or engine 88 which is mounted on the top wall 47 of the frame 15.

A pair of front steerable wheels 89 are rotatably carried by forks 90, which have a stem or vertical shaft 91 journalled through bearing brackets 92. The frame 15 also includes upper bearing brackets 93 through which the shafts 91 rotatably extend and the upper end of each shaft 91 has secured thereto a steering knuckle or lever 94.

The two knuckles or levers 94 are connected together by means of a tie rod 95, and a steering arm 96 is connected with the central portion of the tie rod 95 and with a steering shaft 97 on which a steering wheel 98 is secured.

Figure 2:
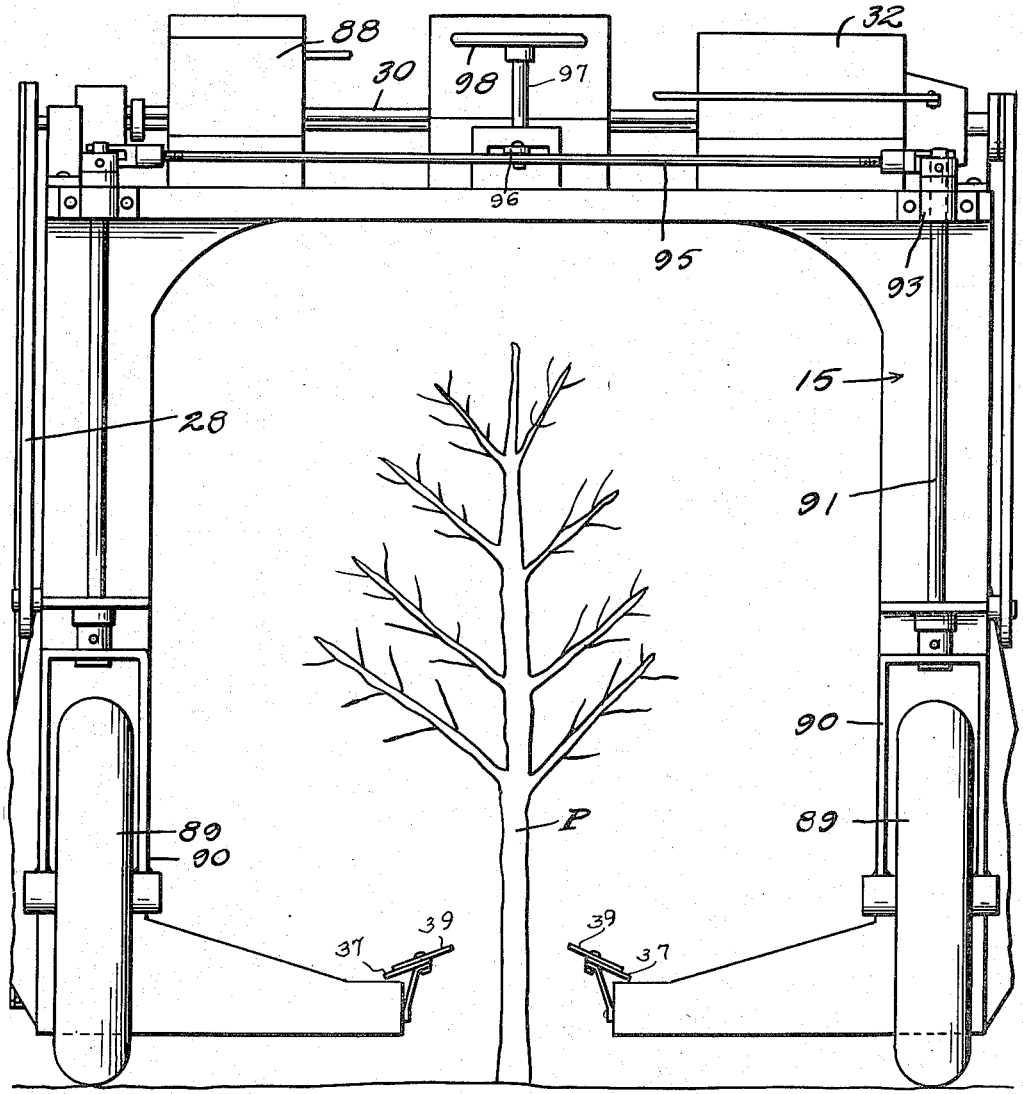
Figure 2 is an enlarged detailed front elevation of the device.
Figure 3:
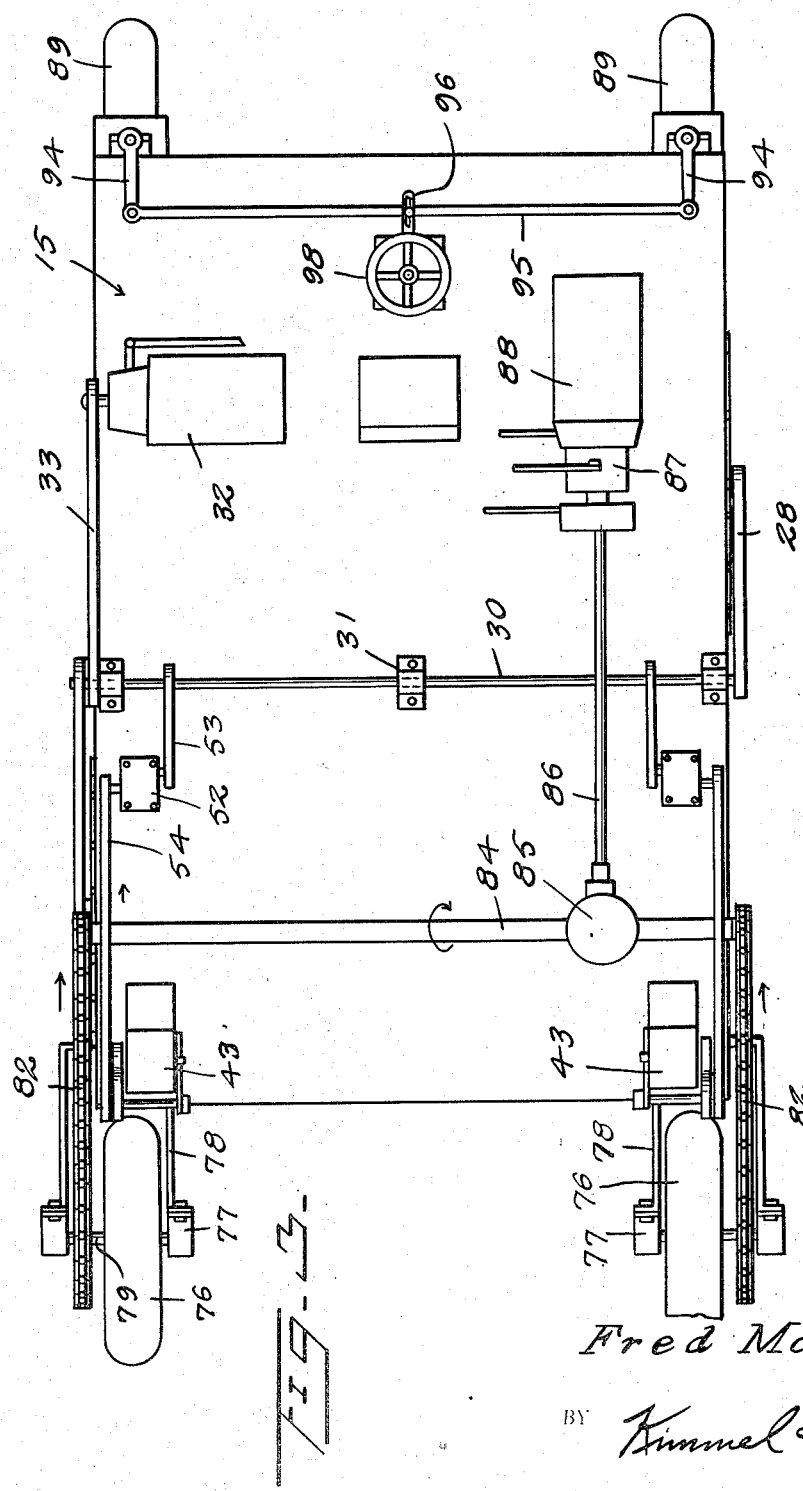
Figure 3 is a plan view of the machine.

In the use and operation of this machine, the machine is moved in a position whereby the plants P will be disposed centrally between the inner plates 39, as shown in Figure 2. The machine is moved over the ground by the power member 88, and the fan blades 21 are rotated at a speed sufficient to produce a draft of air which will blow any ripe berries from the plants, the berries being blown crosswise and striking the vertical inner side walls 17. The berries will then drop downwardly onto the guide walls 34 and will roll downwardly onto the longitudinal conveyors 35.

The conveyors 35 will move the berries rearwardly and discharge the berries onto the transversely ribbed cross elevators 36. The berries on elevators 36 are discharged into the lower ends of the vertical elevator housing 43 and are then picked up by the cups 45 of elevator member 42 and discharged through the spouts 48 into the receivers 50.

It will be understood that the draft of air generated by the fan blades 21 is of sufficient strength to remove any ripe berries from the plants. Preferably, the force of each air stream is such as not to cause the berries to be injured when they are blown from the plants against the inner walls 17 of the frame structure.

This berry picking machine will provide an effective means whereby berries, such as blueberries or the like, may be easily and quickly removed from the plants and the removed berries then conveyed to a receiver as hereinbefore described.

I do not mean to confine myself to the exact details of construction herein disclosed, but claim all variations falling within the purview of the appended claims.

What is claimed is:

1. A berry picking machine comprising an inverted U-shaped frame member having opposing spaced sides, traction wheels carried by said frame, inwardly projecting spaced apart bottom walls on the lower ends of said sides, the inner free edges of said bottom walls being spaced apart whereby the bottom walls can straddle plants, said bottom walls being inclined inwardly and downwardly, a fan carried by each side of said frame adapted to create an air stream directed toward the opposite side of the frame, one fan being longitudinally offset with respect to the other fan, operating means for said fans, a longitudinal conveyor adjacent the inner edge of each wall, a pair of receivers carried by said frame, and means associated with said frame receiving the berries from said conveyors, and conveying the berries to said receivers.

2. A berry picking machine comprising a mobile frame having spaced apart parallel sides, traction wheels carried by said sides, inwardly projecting members carried by the lower ends of said sides, the inner edges of said members being spaced apart whereby plants may be received therebetween, said plates being inclined inwardly and downwardly, a fan carried by each vertical side of said frame adapted to create an air stream directed toward the opposite side of the frame, one fan being longitudinally offset with respect to the other fan, operating means for said fans, a longitudinal conveyor adjacent the inner edge of each of the members, an upwardly and inwardly inclined plate carried by said members and extending from the inner edge of each conveyor, a pair of receivers carried by said frame, and means receiving the berries from said conveyors and conveying the berries to said receivers.

3. A berry picking machine comprising a frame having a pair of parallel sides, traction wheels carried by each side, inwardly projecting and downwardly inclined bottom walls on the lower ends of each side, the bottom walls being spaced apart to straddle plants, a fan carried by each side, one fan being longitudinally offset with respect to the other fan, said fans creating parallel transverse air streams, operating means for said fans, a longitudinally extending horizontally disposed conveyor mounted at the free edge of each bottom wall, an upwardly and inwardly inclined plate extending from the inner edge of each conveyor, a receiving means carried by the frame and means associated with the conveyors for conveying the berries therefrom to said receiving means.

4. In a berry picking machine which includes a pair of spaced apart sides each having means creating transverse air streams therebetween, a collecting and conveying means carried by each side and including longitudinally extending substantially V-shaped troughs provided on the inner portions of the sides at their lower ends and having open bottoms and longitudinally extending conveyors horizontally disposed in said troughs and closing off the bottoms thereof.

FRED McDOWELL.

References Cited in the file of this patent

UNITED STATES PATENTS

| Number | Name | Date |
|---|---|---|
| 1,137,545 | Shoffer | Apr. 27, 1915 |
| 1,501,334 | Hanson | July 15, 1924 |
| 1,711,316 | Higgins | Apr. 30, 1929 |